United States Patent [19]

Jackson

[11] 4,343,698
[45] * Aug. 10, 1982

[54] WATER INTAKE

[75] Inventor: Philip Jackson, Paris, France

[73] Assignee: E. Beaudrey & Cie, Societe Anonyme, Paris, France

[*] Notice: The portion of the term of this patent subsequent to Mar. 11, 1997, has been disclaimed.

[21] Appl. No.: 227,670

[22] Filed: Jan. 23, 1981

[30] Foreign Application Priority Data

Feb. 5, 1980 [FR] France .............................. 80 02424

[51] Int. Cl.³ .......................................... B01D 33/02
[52] U.S. Cl. .................................. 210/107; 210/157; 210/161
[58] Field of Search ................. 210/107, 161; 405/81, 405/83, 127; 43/17.1, 4.5

[56] References Cited

U.S. PATENT DOCUMENTS

| | | | |
|---|---|---|---|
| 1,515,547 | 11/1924 | Burkey | 43/17.1 |
| 2,778,140 | 1/1957 | Applegate et al. | 405/81 |
| 3,061,966 | 11/1962 | Kreutzer | 43/17.1 |
| 3,069,797 | 12/1962 | Kreutzer | 43/4.5 |
| 3,180,047 | 4/1965 | Kreutzer | 43/17.1 |
| 3,638,346 | 2/1972 | Stem | 43/17.1 |
| 3,802,109 | 4/1974 | Stem | 43/17.1 |
| 3,859,954 | 1/1975 | Paulerich | 43/17.1 |
| 4,192,749 | 3/1980 | Jackson | 210/161 |

*Primary Examiner*—Charles N. Hart
*Assistant Examiner*—Sharon T. Cohen
*Attorney, Agent, or Firm*—Charles E. Brown

[57] ABSTRACT

A water intake for example for taking cooling water for industrial installations from a river, a lake or the sea, has a sieve with a filter element and a recovery channel associated with the filter element for collecting and saving elements of the biomass which become stuck to the filter element. Electrodes are associated with the recovery channel 25 and are designed to induce an electrical field, at right angles to the recovery channel in the water to be tapped, so as to compel fish either to swim by themselves in the direction of this recovery channel or to allow themselves to be carried towards the recovery channel by a reverse water current induced at right angles thereto.

8 Claims, 4 Drawing Figures

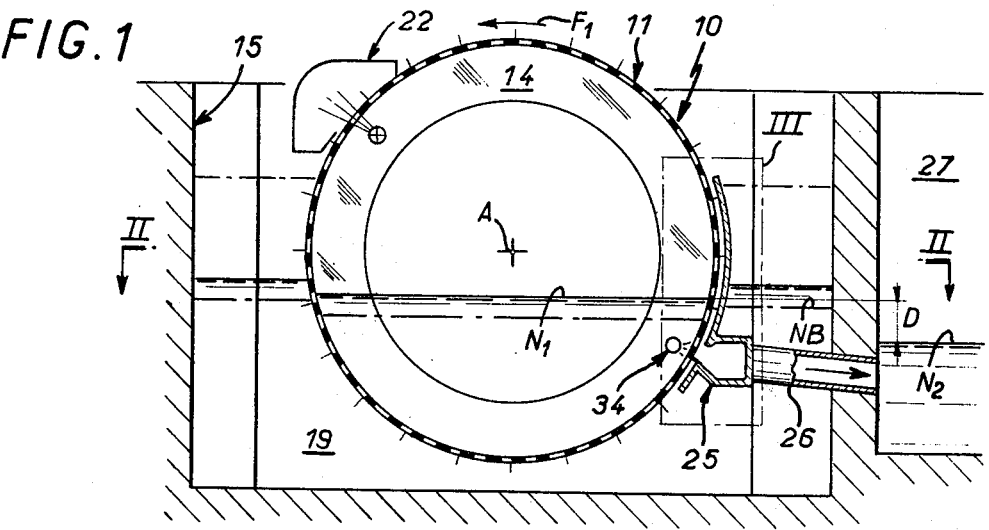
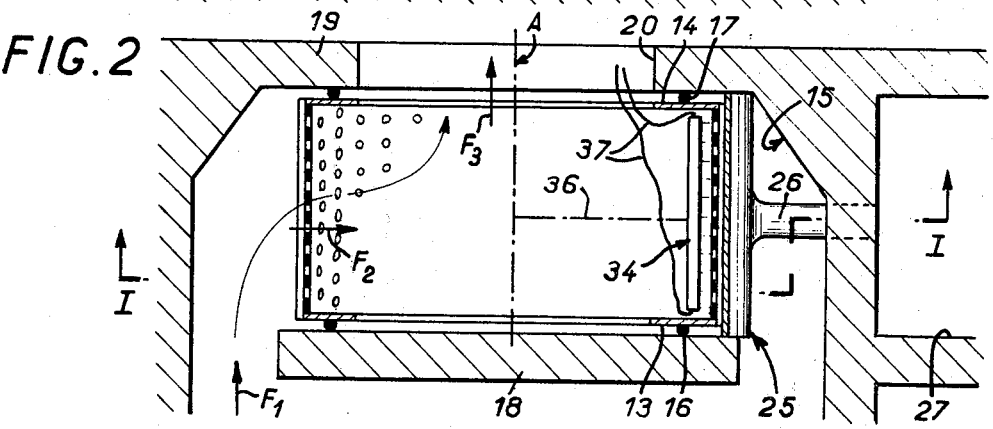
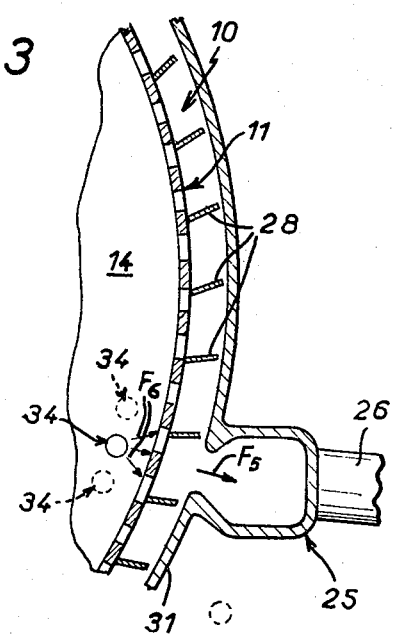
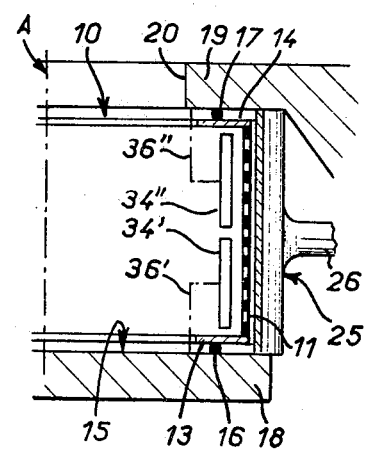

WATER INTAKE

This invention relates to water intakes of the kind conventionally used to supply an industrial installation with water, particularly to supply such an installation with cooling water. The intake may be a sea-water intake or a water intake from a lake or river.

Water intakes of this kind usually comprise a sieve having a filter element, for example a rotary chain or drum filter, the meshes of which have an aperture of only a few millimeters and through which the water to be taken must pass.

The filter element of a sieve of this kind moves cyclically from a submerged position, in which it is progressively charged with particulate waste and various elements, especially with elements of the biomass, such as algae, plankton, fish eggs, crustaceans and fish; to an emerged position, in which it is subjected to counter-current washing, in order to clear those wastes, particles, and elements from it and thus prevent it from becoming clogged.

The present invention relates, more particularly, to water intakes, in which the filter element of the sieve has an associated safety device, which is designed to ensure that the elements of the biomass, which are picked up by the filter element are not lifted out of the water in a way which would be detrimental to their survival.

Such a safety device is described in the French patent application No. 77 20258 which was filed on July 1, 1977 and published under No. 2.396.123. Attention is also called to my U.S. Pat. No. 4,192,749 which claims priority from the French patent application No. 77 20258.

The safety device described therein comprises, opposite the filter element of the sieve and upstream of the sieve, relative to the passage through this filter element of the water to be tapped, and below the level of the lowest waters, a recovery channel, which extends transversely to said filter element and whose concavity is turned towards said filter element, this recovery channel being subjected to pressure-lowering means, which are designed to induce locally, at right angles to the recovery channel, a reverse circulation of water through the filter element.

This reverse current circulation is almost always sufficient to dislodge gently from the filter element those elements which are stuck to it, particularly those of the biomass, which are, from that moment, carried along in the direction of the recovery channel and which are received into that channel without emerging from the water, subsequently being returned, unharmed, to their original environment.

Although a safety device of this type has given and continues to give satisfaction, particularly for elements of low or zero mobility, it occasionally fails with fish, which are momentarily stuck due to fatigue, against the filter element because they cease struggling against the current which carries them towards it. However, as the fish pass in front of the recovery channel at the moment which a small drag effect results from the reversal of current at right angles to said recovery channel, they remain sufficient energy to react by swimming again against the current, which prevents them from being carried in the direction of the recovery channel.

It is an object of the present invention to provide an arrangement designed to compel all the fish to head for the recovery channel, by taking advantage of the known reactions of fish when they are subjected to an electrical field, the reaction of the fish being, either to be momentarily tetanised or guided definitely in the direction of such an electrical field.

SUMMARY

The invention provides a water intake comprising a sieve having a movable filter element, and a recovery channel which is opposite the filter element and is positioned upstream of the filter element considered relative to the passage through this filter element of the water to be tapped. The channel is below the level of the lowest waters and extends transversely to said filter element and has concavity turned towards the filter element. The recovery channel is subjected to pressure-lowering means, which are designed to induce, at right angles to this recovery channel, a reverse circulation of water through the filter element. Associated with the recovery channel are means for generating an electrical field designed to induce an electrical field, at right angles to this recovery channel in the water to be tapped.

Preferably the means for generating an electrical field comprise at least one fixed electrode, which extends transversely to the filter element, on the opposite side of the filter element from the recovery channel, and at right angles to the recovery channel.

For the desired directing of fish to be saved, there is a combination of the effects attributable to the applied electrical field and to the recovery channel. Under the influence of the electrical field, the fish are obliged either, if they retain control of their activity, to swim by themselves in the direction of the recovery channel, or, if they temporarily lose all voluntary behaviour due to tetanisation, to be carried in the direction of the recovery channel by the reverse current induced by the channel. In either case, they are thus received systematically by the recovery channel.

That is, in this way, no fish can escape from the recovery channel.

BRIEF DESCRIPTION OF THE DRAWINGS

Some embodiments of the invention will now be described, by way of example, with reference to the accompanying schematic drawings in which:

FIG. 1 is a view in cross-section of a water intake according to the invention, along the broken line I—I of FIG. 2, FIG. 2 is a plan view of this water intake, along the line II—II of FIG. 1, FIG. 3 illustrates, on a larger scale, a detail of FIG. 1 marked by an inset III in FIG. 1, and FIG. 4 illustrates, in part, FIG. 2 and relates to a second embodiment.

DETAILED DESCRIPTION

The drawings illustrate the application of the invention to a water intake having a sieve in the form of a filter drum 10, of circular cross-section. The filter element 11 of this sieve is arranged on the periphery of a cylinder having a horizontal shaft A.

The construction of such a filter drum is well known per se and, since it is not part of the present invention, will not be described in detail here.

For this reason the shaft A has been indicated only by an axis in broken lines in FIG. 2 and by the trace of this axis in FIG. 1.

The shaft may be, for example a fixed shaft, and as illustrated in FIGS. 1 to 3 the annular flanges 13, 14 which support the filter element 11 at their axial ends constitute wheels integral with the shaft A (not detailed in the figures).

The filter element is, in this way, mounted rotatably in a cavity 15 of the stonework, with interposed sealing joints 16, 17 between the flanges 13, 14 and the walls 18, 19 of this cavity.

In the embodiment illustrated, the water to be tapped penetrates into the cavity 15 on either side of its wall 18, as indicated by the arrow F1 of FIG. 2, at the exterior of the filter drum 10. The water passes radially through the filter element 11 of the drum, as indicated by the arrow F2 of FIG. 2, then issues axially from the drum, before passing through an opening 20 in the wall 19 of the cavity 15, as indicated by the arrow F3 of FIG. 2.

Thus, in this embodiment, the water to be tapped circulates from the exterior towards the interior of the filter drum 10, but a converse arrangement could be adopted.

The filter drum 10 is partly submerged and partly out of the water, so that, with each cycle of rotation, its filter element 11, which rotates, for example in the direction of the arrow F4 of FIG. 1, is successively submerged in and emerges from the water.

In its emergent region part of the filter element 11 travels at right angles to a washing station 22.

As described in French patent application No. 77.20258, the water intake has a recovery channel 25, opposite the filter element 11, and upstream of the filter element considered relative to the passage through this filter element of the water to be tapped. The channel 25 is below the level of the lowest waters NB and extends transversely of the filter element 11, parallel to a generatrix of element 11. The recovery channel 25 has concavity which is turned towards the filter element 1, and is influenced by pressure-lowering means which are designed to induce a reverse circulation of water through the filter element 11, at right angles to the recovery channel as indicated by arrow F5 of FIG. 3.

In the embodiment illustrated, the recovery channel 25 discharges through a pipe 26 into a well 27. The pressure-lowering means which are associated with the recovery channel, resulting from the fact that the water level N2 in this well is, at any given time lower by a height difference D than the water level N1 in the interior of the filter drum 10.

However, as specified in the above-mentioned French patent application No. 77.20258, other pressure-lowering means can be employed.

In the embodiment illustrated, the filter element 11 carries, at intervals around its periphery, plates 28, which extend along generatrices, and the recovery channel 25 is formed as a single unit with a downwardly extending screen 31 and an upwardly extending screen 32. These screens 31 and 32 enclose the filter element 11 with a spacing therefrom, a slight play being left between the plates 28 carried by the element 11 and the screens 31 and 32.

According to the invention, there are associated with the recovery channel 25, means for generating an electrical field, which are designed to induce an electrical field at right angles to the recovery channel 25 in the water to be tapped.

In the embodiment illustrated, these means for generating an electrical field comprise at least one fixed electrode 34, which extends transversely to the filter element 11, on the opposite side of the element 11 to the recovery channel 25, and at right angles to the channel 25.

In practice, and as indicated by broken lines in FIG. 3, several fixed electrodes 34 can be provided which electrodes are positioned at intervals around the filter element 11, parallel to generatrices of element 11, so as to induce a virtually homogeneous electrical field over a height corresponding, at least, to the opening of the recovery channel 25.

When the shaft A is fixed as in the embodiment of FIGS. 1 to 3, such an electrode 34 can be carried by an arm 36 integral with this shaft A, as indicated by broken lines in FIG. 2.

Alternatively, as illustrated in FIG. 4, when the shaft A rotates, the filter element 11 is supported by a single wheel integral with this shaft in the central region of the shaft, and the electrode 34 is constituted by at least two electrode elements 34', 34", which are aligned with one another, on either side of such a wheel, and which are each carried at the end of an arm 36', 36". The arm 36' is integral with the wall 18 of the cavity 15 and the arm 36" is integral with the wall 19 of this cavity 15.

The electrode or electrodes 34 are each connected to a voltage source by means of conductors 37, as indicated in FIG. 2, and are thus at a specific potential, and generate an electrical field at right angles to the recovery channel 25. At least some of the lines of force are of the field directed towards the recovery channel 25, as indicated by the arrows F6 in FIG. 3.

By varying the potential of the electrode or electrodes 34, this electrical field is adjusted in such a way that, when the fish, which have previously been stuck against the filter element 11 and thus dragged along by it, arrive at right angles to the recovery channel 25, they are obliged either to swim by themselves in the direction of this recovery channel 25 or, temporarily abandoning any voluntary behaviour, to allow themselves to be carried by the reverse current induced at right angles to the recovery channel by the pressure-lowering means associated therewith.

In practice, since the effects of an electrical field on a fish are proportional to the length of such a fish and vary according to the species, simultaneously some fish are guided and others are tetanised.

For the same reasons, the potential applied to the electrode or electrodes 34 depends on the species most frequently encountered in the environment to be treated; and also depends on the conductivity of this environment. A potential of a few volts is usually sufficient.

As indicated by broken lines in FIG. 3, at least one additional electrode 38 can be provided, beneath the recovery channel 25 and on the same side of the filter element 11 as the recovery channel.

The electrical field due to this electrode 38, advantageously dissuades the fish from attempting to by pass the recovery channel 25 and from being caught by the filter element 11 beyond said recovery channel. When employing the electrode 38 the upper screen 32 associated with the channel 25 can be dispensed with.

The invention can be employed either where the sieve is a rotary drum as described and illustrated, or, a chain filter is used, whose movable filter element constitutes an endless loop, or where such a filter element is mounted for movement in its own plane, alternating with a similar parallel filter element.

I claim:

1. A water screen for a water intake, said water screen comprising an endless filter element having a surface constructed and arranged for movement generally about an axis and for the general radial flow of water therethrough, means defining a water flow zone with an inlet thereinto in which water being filtered may flow through said filter element surface, said safeguarding means associated with said filter element surface for safeguarding living matter particularly fish in water to be screened, said safeguarding means including a recovery channel having an open end located adjacent said filter element surface remote from said water flow zone inlet and generally facing said filter element surface with said open end being arranged to be immersed during the operation of said water screen, suction means attached to said recovery channel for effecting water flow through said filter element surface into said recovery channel in a direction through said filter element reverse to the intended direction of flow of water to be filtered through said filter element, a shield member extending upwardly from said recovery channel open end adjacent to said filter element surface, said shield member being of a configuration complimentary to the shape and path of movement of said filter element surface and being generally uniformly spaced from said filter element surface, whereby living matter entrained against said filter element surface is directed into said recovery channel open end without being directed up and around said filter element surface, and means for generating an electrical field associated with said recovery channel and inducing said electrical field at right angles to the recovery channel in the water to be tapped.

2. A water intake according to claim 1, wherein the means for generating an electrical field comprise at least one fixed electrode, which extends transversely to the filter element, on the opposite side of the filter element from the recovery channel, and at right angles to the recovery channel.

3. A water intake according to claim 2, wherein several electrodes are spaced at intervals along the filter element.

4. A water intake according to claim 2 or claim 3, wherein the means for generating an electric field comprises at least two electrode elements which are aligned with one another.

5. A water intake according to claim 2, wherein at least one additional electrode is provided, on the same side of the filter element as the recovery channel, and beneath the recovery channel.

6. A water intake according to claim 5, wherein the means for generating an electric field comprises at least two electrode element which are aligned with one another.

7. A water intake according to claim 3, wherein at least one additional electrode is provided, on the same side of the filter element as the recovery channel, and beneath the recovery channel.

8. A water intake according to claim 6, wherein the means for generating an electric field comprises at least two electrode elements which are aligned with one another.

* * * * *